Figure 1:
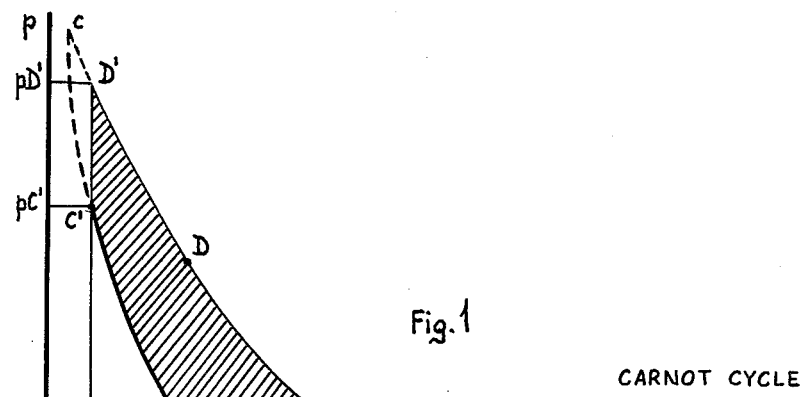

CARNOT CYCLE

COMPRESSION PHASE
OF
CARNOT CYCLE

EXPANSION PHASE
OF
CARNOT CYCLE

United States Patent Office 3,218,803
Patented Nov. 23, 1965

3,218,803
PLANT FOR FRACTIONAL COMPRESSION AND EXPANSION GAS TURBINE
Enrico Reggio, Corso Andrea Podesta, 8/7, Genoa, Italy
Filed Sept. 12, 1962, Ser. No. 223,064
Claims priority, application Italy, Sept. 23, 1961, 686,185
8 Claims. (Cl. 60—39.76)

The present invention relates to a plant for fractional compression and expansion gas turbine.

The present invention has for its object a plant, with an operation cycle similar to a gas turbine open cycle, the type of apparatus is today having the largest application. This type of apparatus is greatly used because of its mode of operation, the limited weight and dimensions, its low cost, and the ease and rapidity with which it can be placed in operation.

However the gas open cycle has several disadvantages, among which are very low efficiency and a limited power factor, and it usually requires for a determined useful power a compressor with substantially twice the required output power and a turbine with substantially three times the required power.

The invention has as a principal object a gas turbine power plant differing from those known heretofore. In the known gas turbine power plants gas is provided continuously at a constant pressure and is applied continuously to the gas turbine at this pressure thereby using the gas inefficiently since the lower pressure stages of the turbine allow large residual losses in the gas. According to the invention a constant volume combustion chamber delivers gas intermittently and the gas is delivered to the gas turbine in successive discrete quantities at pressures decreasing from one quantity to a next successive quantity so that the turbine stages receive gas at respective pressures from which minimum residual losses occur.

The gas turbine according to the present invention is characterized by the fact that compression, passive work, and expansion, active work, are effected through suitable means capable of supplying to the combustion chamber, at constant volume, discrete quantities of air at progressively increasing pressure until the maximum operating pressure, and respectively take from the combustion chamber exhaust gas or working fluid at progressively decreasing pressure to apply it into elements of the turbine working at a determined gas pressure. Suitable means keep constant the above gas temperature in the combustion chamber during the expansion phase.

The gas turbine power plant embodying the above process is characterized by embodying compression means for the air for supporting combustion, working at different pressures, capable to permit fractional drawing of said air at various pressures and providing gas turbine elements working at different pressures which are successively placed in communication with a combustion chamber at constant volume, when the gas pressure in the combustion chamber reaches the determined pressure for their operation.

The above gas turbine power plant is also characterized by presenting a distributing device with a rotating conduit around a fixed point through which it communicates with the combustion chamber. The rotating conduit end is successively in correspondence with openings of fixed conduits communicating with compression means and with turbine elements to progressively increase the pressure of the air supplied to support combustion and supplied into the combustion chamber, and to apply combustion gas to respective turbine elements capable of effecting work for the value of gas pressure in that determined moment, in order to obtain the utmost utilization of gas pressure as it progressively decreases.

The above gas turbine power plant, in one of its preferred embodiments, is characterized by the fact that air compression means are constituted by elements of an axial or a radial compressor.

The above plant, in another preferred embodiment, is characterized by the fact that air compression means are partially constituted by elements of an axial or a radial compressor, and partially by a volumetric compressor having one or more elements in series capable of introducing into the combustion chamber compressed air at higher pressures, after the axial compressor has introduced air at lower pressures.

The above plant is also characterized by providing means capable of maintaining gas in the combustion chamber at a constant temperature during an expansion phase by means of fuel injection and ignition during the expansion phase.

The above plant is characterized by provision of means cooling compressed air at least at one side of compression means, before it is introduced into the combustion chamber, in order to realize compression conditions as near as possible to isothermal compression.

The appended drawings, tables illustrate, only as examples, some explanatory diagrams and a schematic embodiment of a gas turbine power plant according to the present invention.

Figure 2:
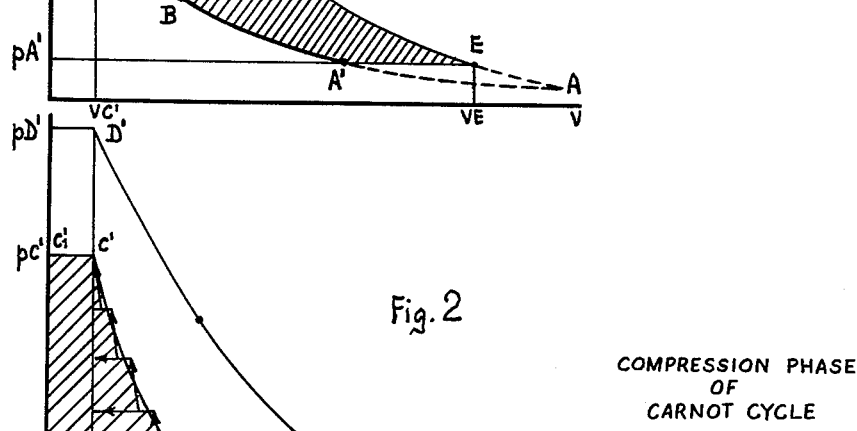
Figure 3:
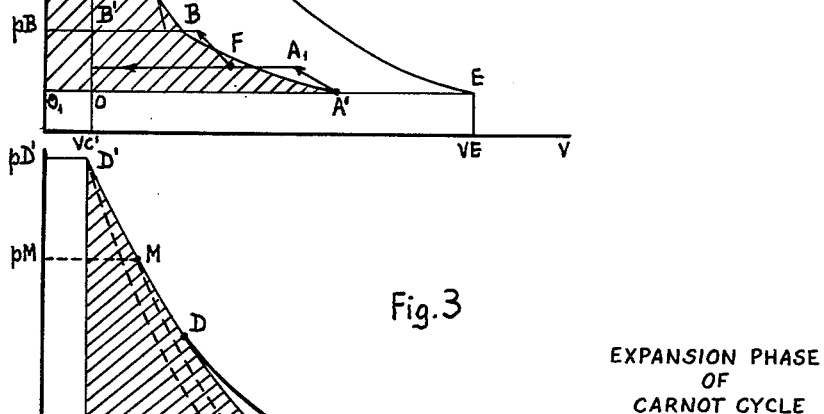
Figure 4:
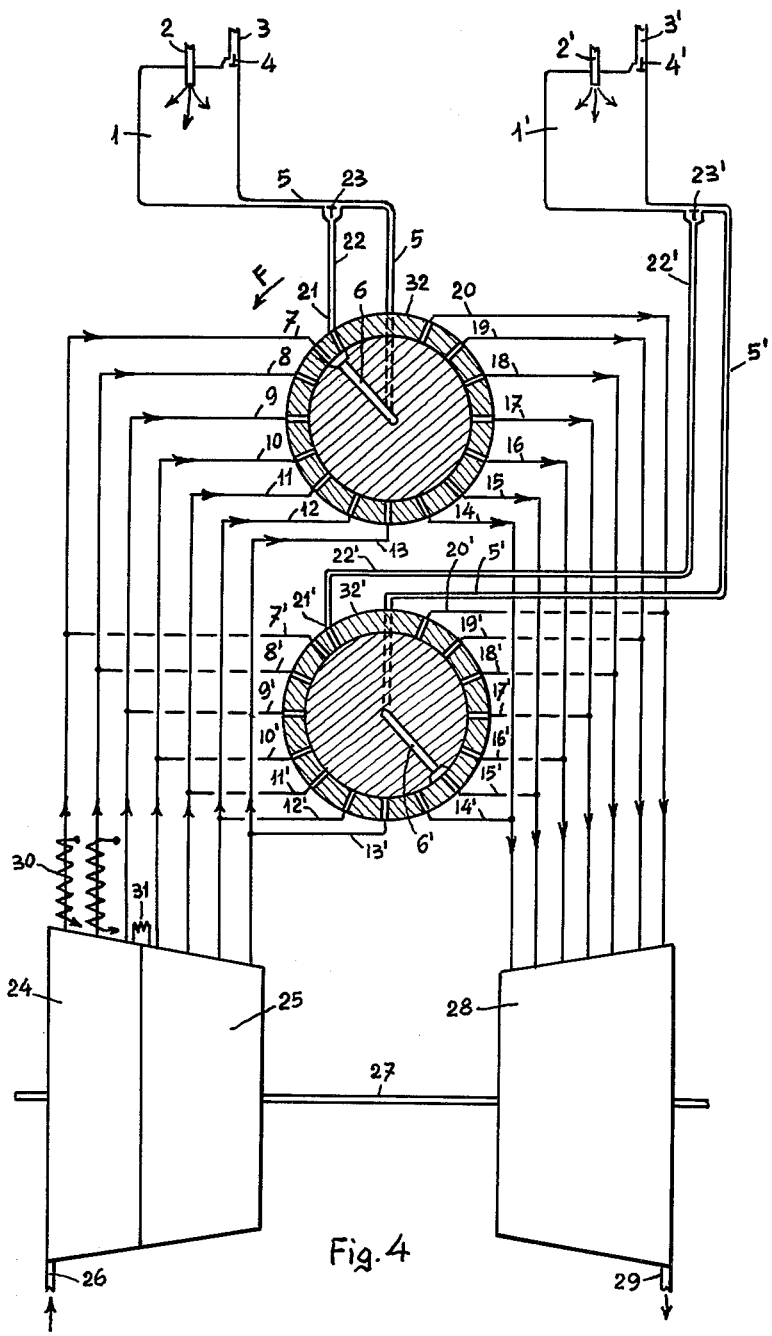

FIG. 1 is a diagram illustrating a Carnot cycle at a constant gas weight; FIGS. 2 and 3 are diagrams respectively of a compression and expansion phase of a Carnot cycle as they are realized in a plant according to the invention; the diagrams do not represent the cycle with gas at a constant weight, since gas weight changes at different points, but illustrate pressures as a function of effective instantaneous volume, and therefore they may be similar to the diagram or indicator card developed from a piston motor working at variable gas weight; FIG. 4 is a schematic representation of an embodiment of the plant with two combustion chambers and two distributors.

With reference to FIGS. 1 to 3, in which values $v$ representing specific volumes are plotted on the abscissa, while values $p$ of pressure are plotted as in ordinates, the area contained within the points A, B, C, and D represents the theoretical Carnot cycle. The area contained within the points A', B', C', D', D, E represents the Carnot cycle modified for its practical embodiment.

As well known the embodiment of a Carnot cycle was up to now impossible in practice, in which the weight of fluid is maintained constant in the cycle, that is all the fluids mass participates at the same time in all the transformations that the diagram lines represent. However, the possibility exists if in most of the cycle the concept of lines drawn in the diagram illustrative of the concept of contemporaneous changes of the whole mass is abandoned and there are substituted a series of changes of parts of the same mass which effect separately and successively different changes.

In such a system the only phase in which the complete mass participates at the same time is the one of heating at constant volume, represented by the line C'D'.

FIG. 2 considers only the phase of "fractional compression" constituted by the lines A'B and BC', the first one being an isothermal line and the second one an adiabatic line.

In practice the compressors usually employed in gas turbine plants compress at each stage all the gas they receive at lower pressure, that is according to a line $C_1A'$. And after having effected made the compression according to a curve line A'BC', they discharge according to the line $C'C_1'$ at a higher pressure. The work of compression is thus represented by the area $A'BC'C_1'O_1$ relative to the constant weight of one kilo of gas taken in.

As it may be seen this area is remarkably larger than the area A'BC'O representing the work of compression of the adopted fundamental cycle.

In order to avoid this extra work represented by the area OC'C$_1$'O$_1$ and limit the compression work as near as possible to the theorical one, corresponding to the one of Carnot cycle, according to the present invention it was though to extract gas during compression in successive parts instead of extracting it in as a total mass at the end of compression, as is done in present constant pressure gas turbine plants.

The stepped line A'BC' represents in fact a series of elementary compressors, each one of them is followed by a constant pressure line.

In the lower part A'B, each raking section line A'A$_1$ represents the compression of the quantity of gas, taken in, along the line at constant pressure OA' and each following horizontal section, for example A'f, represents first the volume reduction due to cooling of gas mass compressed as later described, by the compressor element and then the reduction of volume due to the elementary drawing of gas at that pressure. In the part BC', as there is no cooling and the compression is adiabatic or polytropic, each section at constant pressure is shorter as it represents only the volume reduction due to elementary drawing of gas.

In this case the total work of compressor single elements is represented by the area contained within the stepped line A'BC' and by the lines C'O and OA'.

The area value is smaller as the steps are nearer and consequently the elementary pressure ratios are small.

The fractional expansion phase realizes a similar process as the fractional compression, after that all the gas, previously compressed in the combustion chamber at constant volume $vc'$ (FIG. 3), heated by fuel injection, has executed the evolution represented by the line C'D'. Once the maximum pressure PD', corresponding to the point D' of the cycle, is reached, the heating of the air previously partially exhausted continues with the intake of fuel, while it begins to draw the same gas and to apply it to the turbine corresponding to the utmost pressure $pD'$ (line D'A').

Because of gas intake pressure in the combustion chamber is reduced and therefore the following intake will be eflected at a lower pressure, for instance $pM$ (point M).

The gas taken in is then applied to the turbine not simply to a first stage at a maximum pressure $pD'$, but also to the following stages at lower pressures such as a lower pressure $pM$ which exists at that moment in the combustion chamber, in order to execute the evolution MM'. Operation continues in this way until pressure is reached corresponding to the point M of the diagram, in which heating is excluded.

It is obvious that fuel delivery must be executed according to a well determined law; so that, while gas and pressure decrease in the combustion chamber, the temperature of gas still contained in it is constant.

An embodiment of a gas turbine power plant according to the present invention is illustrated in FIG. 4, in which a combustion chamber 1 is provided with a fuel injector 2. A relief conduit 3 communicated with the interior of the chamber 1 and has a check valve 4. A conduit 5 of alternate passage, in opposite directions of compressed air and combustion gas is provided according to the position assumed by a rotating conduit 6, placed in communication successively with air supply conduits 7 to 13 supplying air progressively compressed and with conduits 14 to 20 for exit, discharge or exhaust of combustion gas at progressively decreasing pressure an opening 21 placed in communication with the conduit 22, closed by a check valve 23 is provided to effect scavenging of the combustion chamber. Another apparatus dented by reference numerals 1' to 23', similar to the one 1 to 23, is provided with a rotating conduit 6' integral in rotation with conduit 6, but 180° out of phase in comparison to it. An isothermal compressor 24 in series an adiabatic compressor 25 takes a suction on atmospheric air through only one or common conduit 26 and is connected by axis 27 to a gas turbine 28, from which exhaust gas is exhausted through an only exhaust conduit 29. Refrigeration coolers or coils 30 and 31 are illustrated diagrammatically for cooling the compressed air from the isothermal compressor 24. Rotary distribution means 32 and 32' are respectively the whole of the rotating conduit 6 with fixed conduits 7 to 20 and the rotating conduit 6' with fixed conduits 7' to 20'.

The operation of the apparatus is as follows: Compressor 24–25 takes a suction on atmospheric air and compresses it through increasing pressure sequential or successive stages until the utmost pressure PC' (FIG. 1) established by the cycle which is to be realized. Compressor 24, having to realize an isothermal compression, is provided with refrigerators or intercoolers capable of removing the heat increase caused by compression. These refrigerators or intercooler, those like 30, are applied on intake conduits for the combustion chambers 1 and 1', and those like 31 are applied in series between one element or stage of the compressor 24 and the following stage of the series compressor 25.

It is obvious that both refrigerators applied in position 30 and those applied in position 31 of compressor 24 may be applied either on all or one part of the elements.

Adiabatic compressor 25 receives compressed air from the compressor 24 and supplies air at higher pressures into the combustion chamber without cooling it.

In order that the compressor group may supply compressed air in successive, discrete fractions, and at increasing pressure from the minimum to the maximum established by the operation cycle into the combustion chamber 1 it is necessary to have the presence of a distributors means provided with a conduit 6, which rotates in direction of an arrow F, and successively in communication with conduit 7 to 13 and connected to the compressor group by a conduit 5, so that the maximum supply pressure of air is reached in combustion chamber 1 when the distributor means is in correspondence or communication with conduit 13.

At this point, or shortly in advance in view of ignititon delay, fuel is injected through the injector 2. This operation is timed with that of distributor 32, by means of apparatus which are not illustrated in the figure.

The fuel is ignited and burns with compressed air, rapidly increasing pressure in chamber 1, until the maximum operating pressure value is reached.

Afterwards conduit 6 is placed in communication or correspondence with conduit 14 and one fraction or part of the combustion gas reaches the first turbine wheel through conduit 5. Pressure in chamber 1 decreases progressively, while distributor 6 places it in communication successively with turbine wheel elements or stages working at lower pressures, until the last element or turbine stage is reached, through conduit 20, from which gas is exhausted at slightly higher pressure than atmospheric pressure.

Sudden gas expansion would reduce the temperature of the combustion gas, this is avoided by a regulated introduction of fuel during the expansion phase. The combustion of this fuel has the object of obtaining a substantially isothermal combustion and therefore a higher useful work. Fuel introduction is stopped at a pressure PN calculated as a function of elements in the fundamental cycle to be realized. From pressure PN to exhaust pressure (as near as possible to atmospheric pressure), gas delivery from combustion chamber 1 is executed adiabatically.

The reduced gas quantity remaining in chamber 1 is purged by opening valve 4 of the exhaust conduit 3, shortly after the last passage of gas to the turbine through conduit 20. To accelerate the scavenging phase of the combustion chamber, a first quantity of air is introduced through a conduit 22, which receives compressed air directly from conduit 7. When distributor 7 is in an intermediate position between conduit 7 and opening 21, which are spaced very near each other in order to communicate at the same time with distributor 6, so that, when this direct communication is finished, due to rotation of distributor 6, the check valve 4 is closed and the first compression phase of the cycle is started.

With the operation only of chamber 1 and distributor 32, as described up to now, an alternate operation is obtained, as only one half of the distributor rotation is utilized for effecting work, while the second half is utilized for compressor operation.

In order to obtain work as an output during the complete rotation of the distributor 32, a similar device 1' to 23' may be applied, working out of phase 180° relative to the first one, so that the expansion phase of the second apparatus corresponds to the compression phase of the first one, and vice versa.

Though the present invention was described and illustrated according to what was previously described, many modifications and changes may be made in the embodiment of the present invention. For example, it is possible to apply several couples of devices 1 to 23, suitably phased relative to each other and supplied by means of one or more series of conduits connected to a compressor group and turbine. Moreover, one part of an axial compressor may be substituted with a volumetric compressor preferably working in the section BC' (FIG. 2) of the compression phase, in such event this section will have in the diagram a curvilinear and continuous course; and furthermore, adiabatic compressor 25 may be substituted with another isothermal compressor of the previous type having two refrigerating means 30 and 31 or only the refrigerating means 30. For small power plants or in particular cases, it is possible to substitute outside cooling of compressed air with inside cooling, by cooling the compressor walls, eventually abolishing completely or partially the use refrigerating means 30 and 31. The above and other changes must however be considered are all based on the fundamental invention concept as claimed in the following claims.

What I claim is:

1. In a gas turbine power plant, in combination, means defining at least one intermittent, cyclically operated combustion chamber, a multi-stage gas turbine, means comprising an air compressor in communication with said combustion chamber for supplying discrete quantities of air under pressure in operation to said combustion chamber successively in one half cycle of operation of said chamber and each at a higher pressure than the preceding quantity, means to supply to said turbine working fluid from said combustion chamber in successive discrete quantities each at substantially the same temperature and at pressures decreasing from one quantity to a next successive quantity in the other half cycle of a complete cycle of operation of said chamber and said turbine comprising stages for receiving respective ones of said quantities of working fluid.

2. In a gas turbine power plant, in combination, means defining at least one intermittent, cyclically operated combustion chamber, a multi-stage gas turbine, means comprising an air compressor, a rotary distributor means in communication with said compressor and said combustion chamber for supplying discrete quantities of air under pressure in a half cycle of operation to said combustion chamber successively and each at a higher pressure than the preceding quantity, means to supply to said turbine working fluid from said combustion chamber in successive discrete quantities each at substantially the same temperature and at pressures decreasing from one quantity to a next successive quantity during a second half cycle of operation, and said turbine comprising stages for receiving respective ones of said quantities of working fluid.

3. In a gas turbine power plant, in combination, means defining two intermittent, cyclically operated combustion chambers, a multi-stage open-type gas turbine, means comprising an air compressor, rotary distributor means in communication with said compressor and said combustion chambers supplying cyclically discrete quantities of air under pressure in operation to each of said combustion chambers successively and each at a higher pressure than the preceding quantity within a given cycle, means to supply to said turbine working fluid alternatively from each of said combustion chambers cyclically in successive discrete quantities each at substantially the same temperature and at pressures decreasing from one quantity to a next successive quantity within a given cycle, said turbine comprising stages for receiving respective ones of said quantities of working fluid, and said rotary distributor means comprises means to supply said quantities of air to said combustion chambers alternatively.

4. In a gas turbine power plant, in combination, means defining at least one intermittent, cyclically operated combustion chamber, a multi-stage open-type gas turbine, means comprising an air compressor in communication with said combustion chamber cyclically supplying discrete quantities of air under pressure in operation to said combustion chamber successively and each at a higher pressure than the preceding quantity, means to supply to said turbine working fluid from said combustion chamber cyclically in successive discrete quantities each at substantially the same temperature and at pressures decreasing from one quantity to a next successive quantity, said turbine comprising stages for receiving respective ones of said quantities of working fluid, and means to cool some of said air quantities supplied to said combustion chamber.

5. In a gas turbine power plant, in combination, means defining at least one intermittent, cyclically operated combustion chamber, a multi-stage gas turbine, means comprising an air compressor in communication with said combustion chamber for supplying discrete quantities of air under pressure in operation to said combustion chamber successively in one half cycle of operation of said chamber and each at a higher pressure than the preceding quantity, means to supply to said turbine working fluid from said combustion chamber in successive discrete quantities each at substantially the same temperature and at pressures decreasing from one quantity to a next successive quantity in the other half cycle of a complete cycle of operation of said chamber and said turbine comprising stages, each of which receives respective ones of said quantities of working fluid and additionally the quantities of working fluid which has already worked in the stages upstream thereof.

6. In a gas turbine power plant, in combination, means defining at least one intermittent, cyclically operated combustion chamber, a multi-stage gas turbine, means comprising an air compressor, a rotary distributor means in communication with said compressor and said combustion chamber supplying discrete quantities of air under pressure in a half cycle of operation to said combustion chamber successively and each at a higher pressure than the preceding quantity, means to supply to said turbine working fluid from said combustion chamber in successive discrete quantities, which are, for the first and bigger part of the discharge, at the same temperature and at pressures decreasing from one quantity to a next successive quantity during a second half cycle of operation, and said turbine comprising stages, each of which receives corresponding quantities of working fluid and additionally the quantities of working fluid which has already worked in the stages upstream thereof.

7. In a gas turbine power plant, in combination, means defining two intermittent, cyclically operated combustion chambers, a multi-stage open-type gas turbine, means comprising an air compressor, rotary distributor means in communication with said compressor and said combustion chambers supplying cyclically discrete quantities of air under pressure in operation to each of said combustion chambers successively and each at a higher pressure than the preceding quantity within a given cycle, means to supply to said turbine working fluid alternatively from each of said combustion chambers cyclically in successive discrete quantities each at substantially the same temperature and at pressures decreasing from one quantity to a next successive quantity within a given cycle, said turbine comprising stages each of which receives corresponding quantities of working fluid and additionally the quantities of working fluid which have already worked in the stages upstream thereof, and said rotary distributor means comprises means to supply said quantities of air to said combustion chambers alternatively.

8. In a gas turbine power plant, in combination, means defining at least one intermittent, cylically operated combustion chamber, a multi-stage open-type gas turbine, means comprising an air compressor in communication with said combustion chamber cyclically supplying discrete quantities of air under pressure in operation to said combustion chamber successively and each at a higher pressure than the preceding quantity, means to supply to said turbine working fluid from said combustion chamber cyclically in successive discrete quantities each at substantially the same temperature and at pressures decreasing from one quantity to a next successive quantity, said turbine comprising stages each of which receives corresponding quantities of working fluid and additionally the quantities of working fluid which have already worked in the stages upstream thereof, and means to cool some of said air quantities supplied to said combustion chamber.

References Cited by the Examiner
UNITED STATES PATENTS

| | | |
|---|---|---|
| 910,237 | 1/1909 | Schmick. |
| 1,258,165 | 3/1918 | Trump _____ 60—43 |
| 2,303,381 | 12/1942 | New _____ 60—39.15 X |
| 2,379,700 | 7/1945 | Franck _____ 60—1 X |
| 2,612,022 | 9/1952 | Keys _____ 60—39.35 |
| 2,623,355 | 12/1952 | Boulet _____ 60—39.76 X |
| 2,928,242 | 3/1960 | Guenther _____ 60—39.39 |

MARK NEWMAN, *Primary Examiner.*

ABRAM BLUM, SAMUEL LEVINE, *Examiners.*